May 6, 1952  C. F. JONES  2,595,584
LEVEL WINDING MECHANISM
Filed May 24, 1949  3 Sheets-Sheet 1
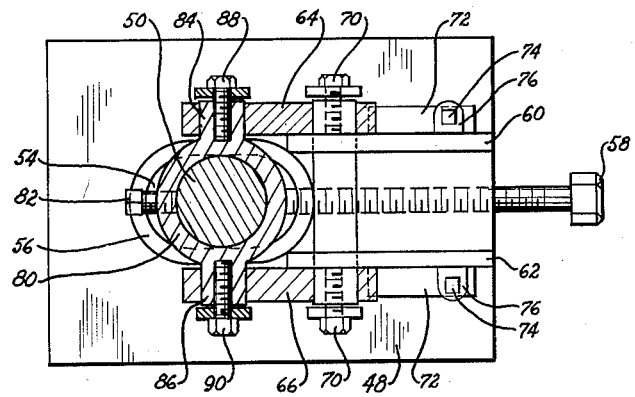
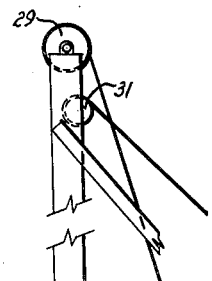
INVENTOR.
Charles F. Jones
BY
Wayland D. Keith
HIS AGENT May 6, 1952  C. F. JONES  2,595,584
LEVEL WINDING MECHANISM
Filed May 24, 1949  3 Sheets-Sheet 2

INVENTOR.
Charles F. Jones
BY
Wayland D. Keith
HIS AGENT

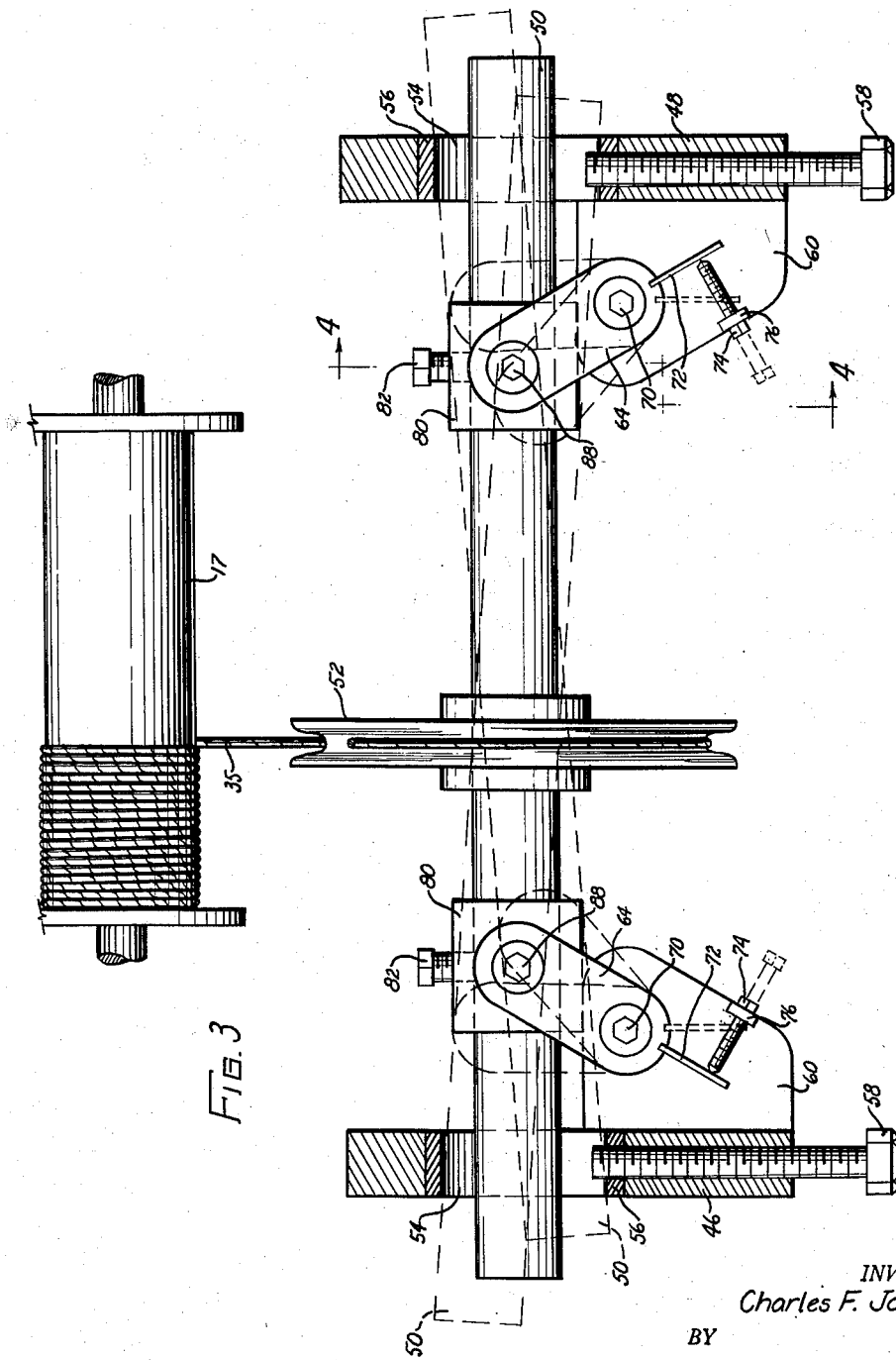

Patented May 6, 1952

2,595,584

UNITED STATES PATENT OFFICE 2,595,584

LEVEL WINDING MECHANISM

Charles F. Jones, Electra, Tex.

Application May 24, 1949, Serial No. 94,999

4 Claims. (Cl. 242—157)

This invention relates to level winding mechanism used in connection with cable spooling devices, and more particularly to such mechanism by which undesirable spooling characteristics in the reeling of cable can be eliminated and improved spooling accomplished.

In the winding of cable with spooling devices there is frequently a tendency for the cable to wind more heavily on one portion of the reel or drum than on another, due to various factors involved in the conditions of operation, making it necessary to use manual means for guiding the cable on the reel in order to assure level winding. Such conditions as uneven wear in the bearings of the spooling device, misalignment of shafts, or changes in the twist of the cable due to variations in load, or a combination of several such factors, are often the cause of uneven winding. Moreover, relatively slight changes in the conditions of operation may involve uneven winding of the cable to such an extent as to greatly impede the use of the machine, or render the same unsafe for operation. Heavy losses due to expensive replacements of damaged cable, or injuries sustained by persons attempting to manually guide the cable in winding the same on the reel, are often encountered, where level winding mechanisms are not used in connection with spooling devices.

This invention has for its principal object, therefore, the provision of level winding mechanisms for use with cable spooling devices, whereby level winding of the cable is accomplished without the employment of manual means for guiding the cable, under all conditions of operation in the spooling of the cable.

A further object of the invention is to provide level winding mechanism capable of adjustment to compensate for heavy spooling of the cable in one portion of the reel, rather than uniformly over the entire winding surface of the same.

Another object of the invention is the provision of level winding mechanism, which is adjustable to compensate for the direction of twist of the cable, which is given the same during its manufacture, and for changes in the twist of the cable due to variations in the load applied to the same in the spooling operation.

Still further objects of the invention are to provide an adjustable level winding mechanism by which uneven wear in the bearings or misalignment in the shafts in the structure of the spooling device may be compensated for without dismantling the machine, or otherwise interfering with its continued operation.

The invention will best be understood from the following description, constituting a specification of the same, when taken in conjunction with the annexed drawing wherein—

Fig. 1 is a side elevational view of one type of spooling device to which the invention may be applied, illustrating the manner in which the level winding mechanism is associated with the cable reeling means;

Fig. 3 is a plan view, partly in section, of a portion of the cable spooling device, showing the details of construction of the level winding mechanism; and Fig. 4 is a cross-sectional view taken along the line 4—4 of Fig. 3, looking in the direction indicated by the arrows.

Figure 2:
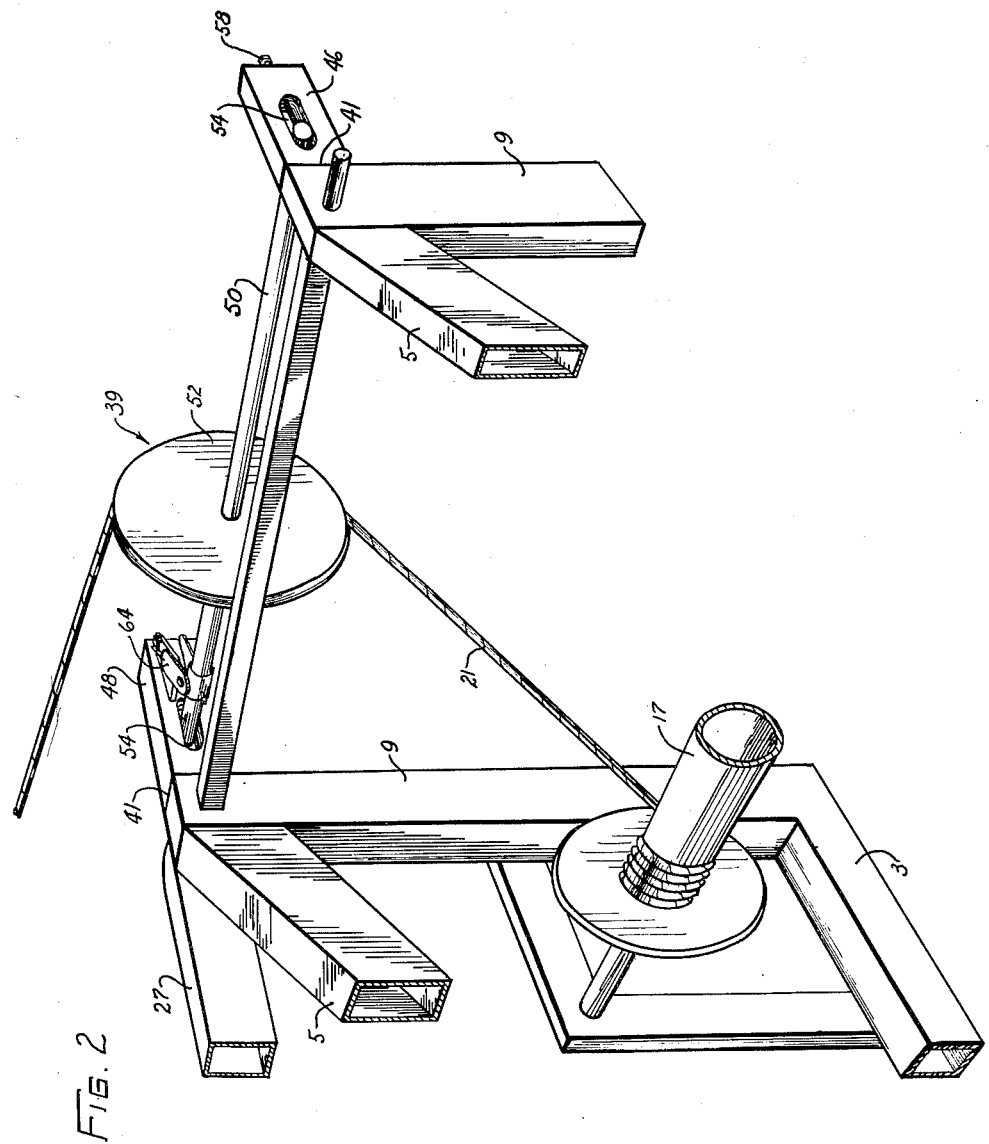
Fig. 2 is a fragmentary perspective view of a portion of the device illustrated in Fig. 1, on a somewhat enlarged scale, showing structural details of the mechanism, and the relationship between the various parts.

While the invention will be described in its application to a particular type of cable spooling apparatus, it is to be understood that the same is capable of use with a wide variety of machines for the general purpose mentioned, and may be applied with equally satisfactory results to any kind of machine in which a cable or the like is wound on a reel or similar spooling structure.

Referring to the drawings in greater detail, Fig. 1, shows a spudder of conventional design, indicated generally by the numeral 1, such as is customarily used in spudding operations in the drilling of oil wells. The spudder may have lower and upper frame members 3 and 5 respectively, upright frame members 7 and 9, and may be supported on wheels 13 and 15 for convenient transportation to the location where the machine is to be used. A mast 11, such as is customarily used with the type of spooling apparatus mentioned may be supported at one end of the frame.

Supported on the frame, for rotation thereon, may be a sand reel 17, drilling drum 19, and band wheels 21, adapted to be driven from a source of power by means not indicated. The band wheel is connected to spudding arms 27, through the intermediation of connecting members 23, for operation by the band wheel 21, and a spudding sheave 25 is mounted between the spudding arms. Sheaves 29 and 31 positioned adjacent the top of the mast 11 are provided to accommodate cables 33 and 35 respectively, leading to the drilling drum 19 and sand reel 17.

As clearly seen in Fig. 1 level winding mechanisms 37 and 39 in accordance with the invention are mounted on the frame of the spudder, in positions to guide the cables 33 and 35 respectively in winding the cables on the drilling drum and said sand reel.

The upper frame members 5 of the spudder are located between the spudding arms 27, as will be seen from an inspection of Fig. 2 of the drawing, and the level winding mechanism generally indicated by 37 is positioned between the frame members 5, while the level winding mechanism indicated at 39 is supported at the end of the spudder, attached to the frame of the same by welding, as indicated at 41, or otherwise.

Each of the level winding mechanisms, as best seen in Figs. 3 and 4 of the drawings, comprises mounting brackets 46 and 48, secured to the frame of the spudder in any desired manner, a shaft 50, carried in said brackets for adjustable movement therein and a traveling sheave 52, mounted on said shaft for free rotation and sliding movement thereon.

The brackets 46 and 48 are formed with elongated slots 54 adapted to receive bushings 56 therein, through which the shaft 50 projects. Each of the brackets 46 and 48 has an adjusting screw 58 extending into the slot 54 therein, for limiting the lateral motion of the shaft 50 in the slot. Plates 60 and 62, which may be formed integrally with the brackets 46 and 48, project inwardly therefrom. Links 64 and 66 are movably attached to the plates 60 and 62 respectively, by bolts 70 or similar means.

Each of the links 64 and 66 has a spring 72 attached thereto, which is engaged by a screw 74, passing through a projection 76 on the corresponding plate to which the link is attached, for a purpose later to be explained.

Collars 80 are positioned on the shafts 50 and retained in position thereon by set screws 82. Each of these collars has diametrically opposed outwardly extending projections 84 and 86 thereon, upon which the links 64 and 66 are respectively pivoted and secured by screws 88 and 90, or similar fastening means.

It will be apparent from an inspection of the drawings that the collars 80 may be moved to different positions on the shaft 50, by loosening the said screws 82, and again tightening the same, and in this manner the respective lengths of the links 64 and 66 may be adjusted with relation to the spaced apart plates 60 and 62 and the shaft 50.

In the operation of the level winding mechanism, as above described, the shaft 50 may move back and forth at its ends in the slots 54 of the brackets 46 and 48, limited by the screws 58, and the respective lengths of the links 64 and 66. As the cable 35 is wound onto the reel 17, the guiding sheave 52 is freely slidable on the shaft 50, and the pull of the cable over the sheave will cause the shaft to assume an angular position with relation to the drum, such that the cable will be at all times wound in even layers, with the adjacent turns in each layer in engagement. In the event that there is a tendency for the cable to move too fast along the length of the drum, during the winding operation, resulting in the turns of the cable being widely spaced apart, the screws 74 can be adjusted in engagement with the leaf springs 72 attached to links 64 and 66, to increase or decrease the tendency of the shaft 50 to move in one direction or the other, whereby the tendency of the cable to wind in spaced turns on the drum can be overcome.

Should there be a tendency for the cable to spool more heavily in one portion of the length of the drum than in another, such tendency can be compensated for by proper adjustment of the screws 58, limiting the motion of the ends of shaft 50 in the brackets 46 and 48, and by suitable adjustment of the screws 74 against the springs 72.

It will be apparent that when the sheave 52 is at one end of its movement on the shaft 50, there will be a tendency for that end of the shaft to be moved toward the drum, with a corresponding movement of the opposite end of the shaft away from the drum. As the cable is wound toward the center of the length of the drum, the sheave will move correspondingly along the shaft 50, and as soon as the sheave has reached the mid-point of its travel along the shaft 50 the pull of the cable will tend to reverse the position occupied by the ends of the shaft in the brackets 46 and 48, resulting in changing the angular relationship between the shaft and the drum, thus assuring continued level winding of the cable on the drum.

It will thus be seen that the invention as described above provides lever winding mechanism of simple design and rugged construction capable of ready adjustment to compensate for various conditions tending to prevent the level winding of the cable, and which mechanism is effective to increase the life of the cable, by assuring the constant level winding of the same, as well as eliminating the hazards to life and limb attendant upon the manual guiding of the cable on the drum during the spooling operation.

While the invention has been described in connection with a particular embodiment of the same, it will be understood that many changes in the details of construction and arrangement of the various parts may be made without departing from the spirit of the invention, and within the scope of the appended claims.

Having thus clearly shown and described the invention what is claimed as new and desired to secure by Letters Patent is:

1. In level winding mechanism for use with cable spooling apparatus including a drum, the combination comprising spaced apart supporting brackets, a slotted opening in each of said brackets, a shaft extending through said openings, a pair of collars adjustably secured to said shaft and each collar being spaced inward from one of said slotted openings, a link pivotally interconnecting each of said brackets to each of said collars to permit swinging action of said shaft, adjustable means on said brackets for limiting the movement of said shaft in said openings, and a freely rotatable guide sheave slidably mounted on said shaft.

2. In a level winding mechanism for use with a cable spooling apparatus including a drum, comprising the combination of spaced supporting brackets, a shaft supported on said brackets by pairs of links, a pair of collars adjustably secured to said shaft, each collar being spaced inward from one of said brackets, said pairs of links pivotally connected to each of said collars and to an adjacent bracket to permit swinging action of said shaft, a cable engaging sheave mounted on said shaft for directing said cable onto said drum in adjacent spooled relation, and resilient means interposed intermediate each of said links and said brackets which resilient means tends to urge said shaft to a normal balanced position.

3. In a level winding mechanism for use with a cable spooling apparatus including a drum, comprising the combination of spaced supporting brackets, a shaft supported on said brackets by pairs of links, a pair of collars adjustably secured to said shaft, each collar being spaced inward from one of said brackets, said pairs of links being pivotally connected to each of said collars and to an adjacent bracket to permit a swinging action of said shaft, a cable engaging sheave mounted on said shaft for directing said cable onto said drum in adjacent spooled relation, a leaf spring mounted on each of said links and extending outwardly therefrom, a lug mounted on each of said brackets adjacent said spring, said lugs having screw threaded bolts passing therethrough in position to engage the respective leaf springs and adjustable thereagainst so as to tend to urge said shaft to a normal balanced position.

4. In a level winding mechanism for use with a cable spooling apparatus including a drum, comprising the combination of spaced supporting brackets, a shaft supported on said brackets by a pair of links, a pair of collars adjustably secured to said shaft, each collar being spaced inward from one of said brackets, said pairs of links pivotally connected to each of said collars and to an adjacent bracket to permit a swinging action of said shaft, a cable engaging sheave mounted on said shaft for directing said cable onto said drum in adjacent spooled relation resilient adjustment means interposed intermediate each of said links and said brackets which resilient means tends to urge said shaft to a normal balanced position, and screw adjustment means on said brackets for positively limiting the movement of said shaft.

CHARLES F. JONES.

REFERENCES CITED

The following references are of record in the file of this patent:

UNITED STATES PATENTS

| Number | Name | Date |
| --- | --- | --- |
| 736,472 | Anderson | Aug. 18, 1903 |
| 1,544,829 | Gibbs | July 7, 1925 |
| 2,195,859 | Gent | Apr. 2, 1940 |
| 2,228,346 | Downie | Jan. 14, 1941 |
| 2,350,928 | Reiners | June 6, 1944 |
| 2,372,232 | Thonburg | Mar. 27, 1945 |